(12) United States Patent
Grannan

(10) Patent No.: US 8,069,255 B2
(45) Date of Patent: Nov. 29, 2011

(54) APPARATUS AND METHOD FOR AGGREGATING DISPARATE STORAGE ON CONSUMER ELECTRONICS DEVICES

(75) Inventor: Michael F. Grannan, Austin, TX (US)

(73) Assignee: AT&T Intellectual Property I, .L.P., Atlanta, GA (US)

( * ) Notice: Subject to any disclaimer, the term of this patent is extended or adjusted under 35 U.S.C. 154(b) by 1556 days.

(21) Appl. No.: 10/464,412

(22) Filed: Jun. 18, 2003

(65) Prior Publication Data

US 2005/0010671 A1 Jan. 13, 2005

(51) Int. Cl.
*G06F 15/16* (2006.01)
(52) U.S. Cl. ...................................... 709/229
(58) Field of Classification Search ............... 709/229, 709/211, 226, 203–205, 223; 726/26, 31
See application file for complete search history.

(56) References Cited

U.S. PATENT DOCUMENTS

| | | | |
|---|---|---|---|
| 4,310,883 A * | 1/1982 | Clifton et al. | 707/205 |
| 6,122,639 A | 9/2000 | Babu et al. | |
| 6,185,574 B1 | 2/2001 | Howard et al. | |
| 6,212,512 B1 | 4/2001 | Barney et al. | |
| 6,317,844 B1 * | 11/2001 | Kleiman | 714/6 |
| 6,369,908 B1 * | 4/2002 | Frey et al. | 358/1.15 |
| 6,883,083 B1 * | 4/2005 | Kemkar | 711/203 |
| 7,046,280 B1 * | 5/2006 | Niikawa | 348/231.9 |
| 7,130,616 B2 * | 10/2006 | Janik | 455/412.1 |
| 2001/0005846 A1 | 6/2001 | Barney et al. | |
| 2001/0033343 A1 * | 10/2001 | Yap et al. | 348/734 |
| 2002/0046232 A1 | 4/2002 | Adams et al. | |
| 2002/0048222 A1 | 4/2002 | Wright et al. | |
| 2002/0055942 A1 | 5/2002 | Reynolds | |
| 2002/0065927 A1 | 5/2002 | Janik et al. | |
| 2002/0069218 A1 | 6/2002 | Sull et al. | |
| 2002/0095416 A1 | 7/2002 | Schwols | |
| 2002/0114341 A1 | 8/2002 | Sutherland et al. | |
| 2002/0180803 A1 | 12/2002 | Kaplan et al. | |
| 2002/0184358 A1 | 12/2002 | Traversat et al. | |
| 2003/0014436 A1 | 1/2003 | Spencer et al. | |
| 2003/0014496 A1 * | 1/2003 | Spencer et al. | 709/217 |
| 2003/0028796 A1 | 2/2003 | Roberts et al. | |
| 2003/0076955 A1 | 4/2003 | Alve et al. | |
| 2003/0126135 A1 * | 7/2003 | Gaxiola et al. | 707/10 |

* cited by examiner

*Primary Examiner* — Douglas Blair
*Assistant Examiner* — Bradford F Fritz
(74) *Attorney, Agent, or Firm* — Toler Law Group

(57) ABSTRACT

A media management module maintains and uses device profile data stored on a computer-readable medium. The device profile data includes, for each of at least one device in a user premise, a respective first data element to indicate whether a device is to remain in or be removable from the user premise, and a respective second data element to indicate whether a memory associated with the device is resident or removable from the device.

22 Claims, 5 Drawing Sheets

FIG. 2A

Device Profile Table — 210

| Device ID | Device Type | Device Characteristic | Memory Base Address | Memory High Address | Address of First Free Memory Block | Memory Type | Media Types Supported | Media Mgmt Attribute |
|---|---|---|---|---|---|---|---|---|
| 08:00:69:02:01:FC | PC | stationary | 61A8000 | AFC8000 | 72AA000 | resident | WM9 video, WM9 audio, MP3 | master |
| 07:00:85:10:20:C1 | Set Top | stationary | 30D4000 | E09C000 | 56DD000 | resident | WM9 video, WM9 audio, MP3, Real | slave |
| 02:00:20:05:09:05 | MP3 | portable | 0 | 9E80000 | 2D00000 | resident | MP3 | client |
| 02:00:39:02:31:FF | Camera | portable | 0 | FA00000 | C0D0000 | removable | TIFF, JPG, MPEG4 | client |

212 / 214 / 216 / 218 / 220 / 222 / 224 / 226 / 228

Media Asset Table — 230

| Media Asset ID | Title | Category | Media Type | First Block Device | First Block Base Address | First Block Byte Size | User Defined Priority Level | Distributor ID |
|---|---|---|---|---|---|---|---|---|
| 145 | Con-Air the Movie | Movie/Drama | MPEG 4 | 08:00:69:02:01:FC | 82DD450 | 42000000 | low | 23 |
| 151 | Dan's Freshman Football | Movie/Home | MPEG 4 | 07:00:85:10:20:C1 | 34AA540 | 11500000 | high | 0 |
| 165 | Garage Rock | Music/Home | MP3 | 02:00:20:05:09:05 | 2400000 | 32000 | medium | 0 |
| 188 | Kelly's Graduation | Images/Home | JPEG | 02:00:39:02:31:FF | 8256500 | 17000 | high | 0 |
| ... | ... | ... | ... | ... | ... | ... | ... | ... |
| 2012 | Beatles Anthology | Music/EMI | MP3 | 08:00:69:02:01:FC | 9604600 | 78000 | medium | 45 |

APPARATUS AND METHOD FOR AGGREGATING DISPARATE STORAGE ON CONSUMER ELECTRONICS DEVICES

BACKGROUND OF THE INVENTION

1. Field of the Disclosure

The present disclosure relates to pooling available memory resources on disparate consumer electronics devices for purposes of sharing same.

2. Description of the Related Art

With the widespread adoption of broadband networks, various consumer electronics devices that support network connectivity are being marketed. Examples of such devices include personal computers, hi-fi stereo shelf units and personal video recording (PVR) devices with Ethernet connections, and portable devices such as MP3 players that connect to a network via a Universal Serial Bus (USB) to retrieve music files over the network. Also available are DVD players with built-in Ethernet connections that facilitate the retrieval of video files over the Internet. The players decode the retrieved video files for viewing on a television set.

Some network-enabled devices, from DVD players to refrigerators, are capable of being accessed remotely via the Internet. Many of these devices are designed to store and play media files, e.g. a personal video recorder is to play video files and an MP3 player is to play music or audio files. As memory prices decline, these devices are being made capable of housing increasing amounts of internal storage.

Consumer product manufacturers are hopeful that users will take advantage of home networking to share media in their homes. For example, Philips hi-fi stereo products support the ability to play media from a home personal computer running special software to manage the storage and play lists of digital music.

Manufacturers of large storage systems are moving to create systems that adopt a virtual storage paradigm. A goal is to have vendor storage products interoperate and be interchangeable for enterprises supporting multi-terabyte databases. The Storage Network Industry Association, whose Internet address is http://www.snia.org, is sponsoring a specification called Bluefin as a storage management standard.

BRIEF DESCRIPTION OF THE DRAWINGS

The present invention is pointed out with particularity in the appended claims. However, other features are described in the following detailed description in conjunction with the accompanying drawing in which:

FIGS. 2A-2B depict embodiments of a device profile table and a media asset table to support the MMS and the MMC;

DETAILED DESCRIPTION OF THE DRAWINGS

Figure 1:
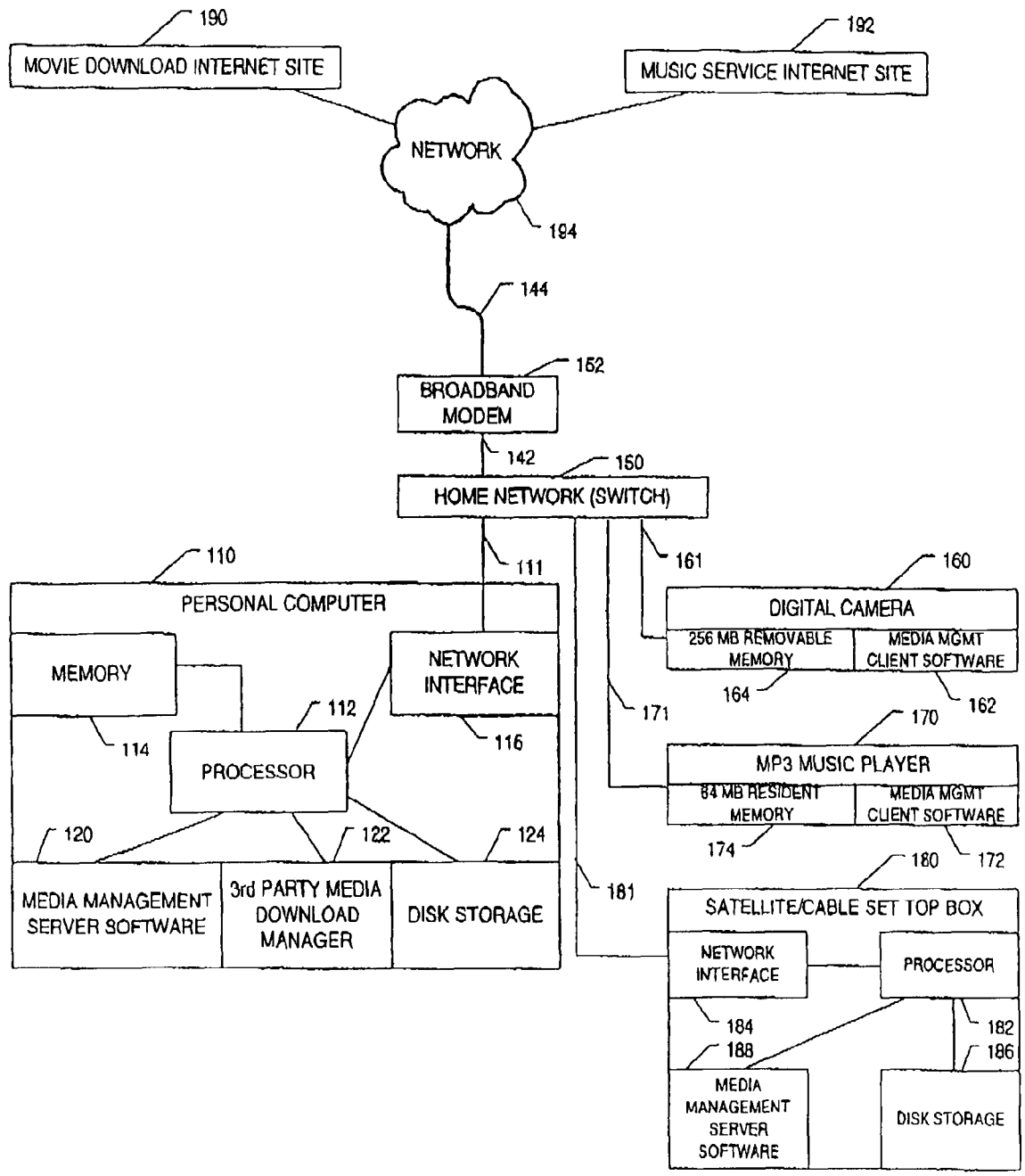
FIG. 1 is a block diagram of an embodiment of a media management server (MMS) device configured in a home network with several media management client (MMC) devices.

It is envisioned that some users may wish to access content stored on one device for playback by another device. To provide benefit and enjoyment, it is desired that the user's network-enabled devices communicate with each other to share media. The storage provided by the communicating devices is thereby aggregated to store the media files.

Accordingly, there is a need for a process to manage the memory available in various devices. The characteristics of the memory available in a user's home is dynamic as he/she buys new devices and discards old devices. In addition, the type of device will dictate how its memory should be used. Some devices have removable memory, other devices are portable and not necessarily in the home at all times, and still other devices are installed and permanently reside in the home until being discarded.

The present disclosure provides a method and system for identifying and logically aggregating the various storage memory available in multiple consumer electronics devices. Also provided is a process to enable devices to access a virtual storage area comprised of all available memory in the home. In a particular embodiment, the system includes a personal computer (PC) that is connected to a switch or a hub, which in turn, is connected to a digital subscriber line (DSL) modem or a cable modem. Installed in the PC is media management server (MMS) software which designates the PC as a broker in the home for accessing most, if not all, available memory of other devices. The user directs the amount of his/her disk storage on the PC to be allocated as part of the virtual storage area to be shared by devices in the home. Other devices, such as an MP3 player and/or a digital camera, have media management client (MMC) software pre-installed therein to facilitate looking for a MMS-capable device on the home network, and using the MMS-capable device to make requests to store or retrieve media content. The MMC device plays back media content retrieved using the MMS-capable device. The PC acts as a virtual repository of media assets in the home, but in reality the assets are distributed across the devices.

In a particular embodiment, the MMS-capable device is one which provides residential home gateway functions (e.g. built-in DSL/cable modem, network address translation, firewall, and home networking options) and also has sufficient primary and/or secondary storage to serve as the media server.

In another particular embodiment, the MMS-capable device is a satellite set-top box (STB), a DSL STB, or a cable television STB for use with a television set. This device comes pre-installed with MMS software that, when powered-on for the first time, leads the user through a setup process requesting if the device is to be the media management server for the home.

In a further particular embodiment, there is no MMS device in the home. Devices run the MMC and communicate via peer-to-peer communications to ascertain memory available on each device. A media asset table and associated information to retrieve and store the content is replicated on all devices with sufficient storage to do same. The associated information may include a linked list of memory blocks where the content resides, and a type of media asset.

In another particular embodiment where there is no specific MMS device in the home, the devices communicate with each other using a specialized software agent framework. Semantics and ontology are defined to handle negotiation aspects between devices as the capacity, availability, and existing media assets of various devices are identified and exploited.

FIG. 1 is a block diagram of an embodiment of a media management server (MMS) device configured in a home network with several media management client (MMC) devices.

The MMS device comprises a personal computer 110 containing a processor 112, a memory 114, a network interface 116 and secondary disk storage 124. The personal computer 110 has MMS software 120 installed therein to act as the in-home manager of all media storage requests made by devices on a home network provided by a home network component 150. The MMS software 120 may be pre-installed in the personal computer 110, or installed by the user after he/she has purchased and taken possession of the personal computer 110.

The MMS software 120 does not inhibit operation of download management software 122 to download multimedia content, such as movie content 190 or music content 192, provided by one or more third-party suppliers. The multimedia content is downloaded via network 194, such as the Internet, and communicated via a broadband link, such as DSL or cable, to a broadband modem 152. The broadband modem 152 communicates with the personal computer 110 via the home network component 150.

The personal computer 110 communicates with the home network component 150 by a data communications link 111. Examples of the data communication link 111 include, but are not limited to, a wireline link such as Ethernet cabling, Universal Serial Bus or power line network components, and a wireless link such as an 802.11 link, a Bluetooth link or an Ultra Wideband link. Accordingly, the network interface 116 comprises at least one of an Ethernet interface, a Universal Serial Bus interface, a power line networking interface, an 802.11 wireless interface, a Bluetooth interface, and an Ultra Wideband interface.

The home network component 150 may comprise a home gateway featuring a built-in switch, network address translation, Internet access and firewall features. Alternatively, the home network component 150 may comprise a switch, where the personal computer 110 supports network address translation and Internet access for other devices on the home network. For purposes of illustration and example, the MMS software 120 is configured to be the master server within the premises.

Within the home premises is a set top box (STB) 180 that provides television service via a satellite or cable television feed. The STB 180 is pre-configured with MMS software 188 at the time of purchase. The STB 180 is similar in architecture to the personal computer 110, having a processor 182, a network interface 184, and secondary disk storage 186. The STB 180 communicates with the home network component 150 by a data communications link 181. Examples of the data communication link 181 include, but are not limited to, a wireline link such as Ethernet cabling or power line network components, and a wireless link such as an 802.11 link.

For purposes of illustration and example, the MMS software 188 configures itself to be a slave server for redundancy within the premises in response to detecting an existing MMS module (namely the MMS software 120) in another device (namely the personal computer 110). Thus, while the MMS software 120 in the personal computer 110 is functioning properly and providing server functions, the STB 180 functions as an MMC device. However, the STB 180 keeps a copy of media asset and device profile tables to account for which media files are stored on all of the devices and how associated memory across the devices is allocated. The STB 180 keeps the tables in order to take over as the MMS if the personal computer 110 should fail. Also for redundancy purposes, the MMS software 120 can manage data replication across multiple devices to ensure that identical pieces of data are stored on different devices.

Also within the home premises are a digital camera 160 and an MP3 portable music player 170. The digital camera 160 has MMC software 162 built-in. The MP3 portable music player 170 has MMC software 172 built-in. The digital camera 160 has shareable memory assets in a memory 164, and the MP3 portable music player 170 has shareable memory assets in a memory 174. For purposes of illustration and example, the memory 164 may comprise 256 MB RAM of removable memory in a form such as SmartMedia™ or Sony's MemoryStick™, and the memory 174 may comprise 64 MB of built-in RAM. The digital camera 160 and the MP3 portable music player 170 connect to the home network via data communication links 161 and 171, respectively. Examples of the data communication links 161 and 171 include, but are not limited to, a wireline link such as Ethernet cabling, power line network components, or a USB connection to another computer device, and a wireless link such as an 802.11, Bluetooth, or infrared link.

Any device supporting the MMC provides the user an option to initialize or otherwise activate the feature. If the user opts not to activate the feature, the device behaves like a standard, standalone device that uses and manages its own memory. An MP3 player, for example, may have its own internal memory management scheme for handling requests to store additional music files.

For devices to function properly when disconnected from the home network, the invocation and use of the MMS software should preserve the internal memory management scheme. Each of the devices 160, 170 and 180 running the MMC software advertises its own internal memory management scheme over its associated one of the data communication links 161, 171 and 181 through the home network component 150 into the personal computer 110. The memory management scheme can be advertised via extensible Markup Language (XML), software agents, or peer-to-peer protocols. The MMS 120 of the personal computer 110, in turn, stores the memory management information in order to adhere to its storage structure.

If the MMC feature is invoked on a device, the device broadcasts a message over the home network querying for the existence of a device serving as the master MMS. Once located, the MMC sends to the MMS information regarding the device characteristics, memory characteristics, memory size, and current allocation status (e.g. in-use vs. available). The device characteristics include data to indicate whether the device is stationary (i.e. permanently remains on the home network or premises) or portable (i.e. removable from the home network or premises). The memory characteristics include data to indicate whether the memory is resident on the device or is removable from the device. Other device characteristics that are sent from the MMC to the MMS are shown in the device profile table.

FIGS. 2A-2B depict embodiments of a device profile table 210 and a media asset table 230 to support the MMS and the MMC. The device profile table 210 and the media asset table 230 are maintained and stored by the MMS software 120 on the personal computer 110. The tables 210 and 230 are stored as computer-readable data elements on computer-readable media such as the memory 114 and/or the disk storage 124. The device profile table 210 maintains a list of all of the devices registered to aggregate their memory and use the virtual memory store provided by the MMS software 120. The media asset table 230 maintains a list of starting locations for all media files stored and managed by the MMS software 120 on behalf of the other MMS and MMC devices.

The device profile table 210 identifies each device by a unique device identifier 212. The unique device identifier 212 may be a Media Access Control (MAC) address of the device, a serial number of the device, or some other device-identifying characteristic. The device profile table 210 further comprises a device type 214 that provides a general description classifier for the device. The device type 214 assists in ascertaining usage and media format playback capabilities of the device. The device profile table 210 further comprises a device characteristic 216 that indicates whether the device is stationary (e.g. to remain in the user premise and home network) or portable (e.g. removable from the user premise or the home network). The device characteristic 216 is used to give portable devices a lesser priority when requests for storage arrive from stationary devices.

The device profile table 210 further comprises a memory base address 218 and a memory high address 220 that define the available memory range and addresses. The memory base address 218 is the first free (e.g. unused) memory block of the device. In one embodiment, the unused memory blocks on the device are managed as a linked list, in which case the memory base address 218 is maintained to locate a root block of the linked list of unused memory blocks. Each free memory block has a header that identifies a byte count of the block, and a base address of the next free memory block on the device.

The device profile table 210 further comprises a memory type 224 that indicates whether the memory is always resident in the device or is removable from the device. A media-types-supported list 226 indicates the various media formats that can be played by the device. A media management attribute 228 indicates the mode of operation of the device, i.e. whether the device is the current MMS master, an MMS slave or an MMC device.

The media asset table 230 identifies each media file by a unique media asset identifier (ID) 232. A title 234 of the media asset and a category 236 of the media asset facilitate searching for media files of interest. A media file type 238 helps devices determine whether they can play the media asset.

As in a standard virtual memory architecture, the media files typically are broken into fragments and stored in pieces. The various memory blocks storing the data for each media asset are associated via a linked list data structure, where each memory block includes a header block that indicates the address of the next block of data associated with the media file. A first block device value 240 indicates the specific device that contains the first memory block of the media file. A first block base address value 242 indicates a physical address of the block on the device. A first block byte count 244 indicates the size of the first block. Optionally, a user-defined priority level 246 is used by a memory allocation algorithm to determine which devices the media asset may be stored (e.g. to resident devices with resident memory). Similarly, when a portable device initiates a storage request, efforts are made to store the media on that portable device.

A distributor ID 248 identifies an original supplier of the media asset. The distributor ID 248 can be used to negotiate a subsequent retrieval of the media asset if lost or destroyed for any reason. One example where a distributor ID 248 is beneficial is if a portable device, that had been allocated to store a portion of a media file, has disappeared from the home network without being retired as described with reference to FIG. 4.

Whenever an MMC device receives a request to store some form of media (e.g. pictures, video, music, or software modules), its respective MMC software facilitates a communication sequence with the MMS software 120 over the home network.

Figure 3:
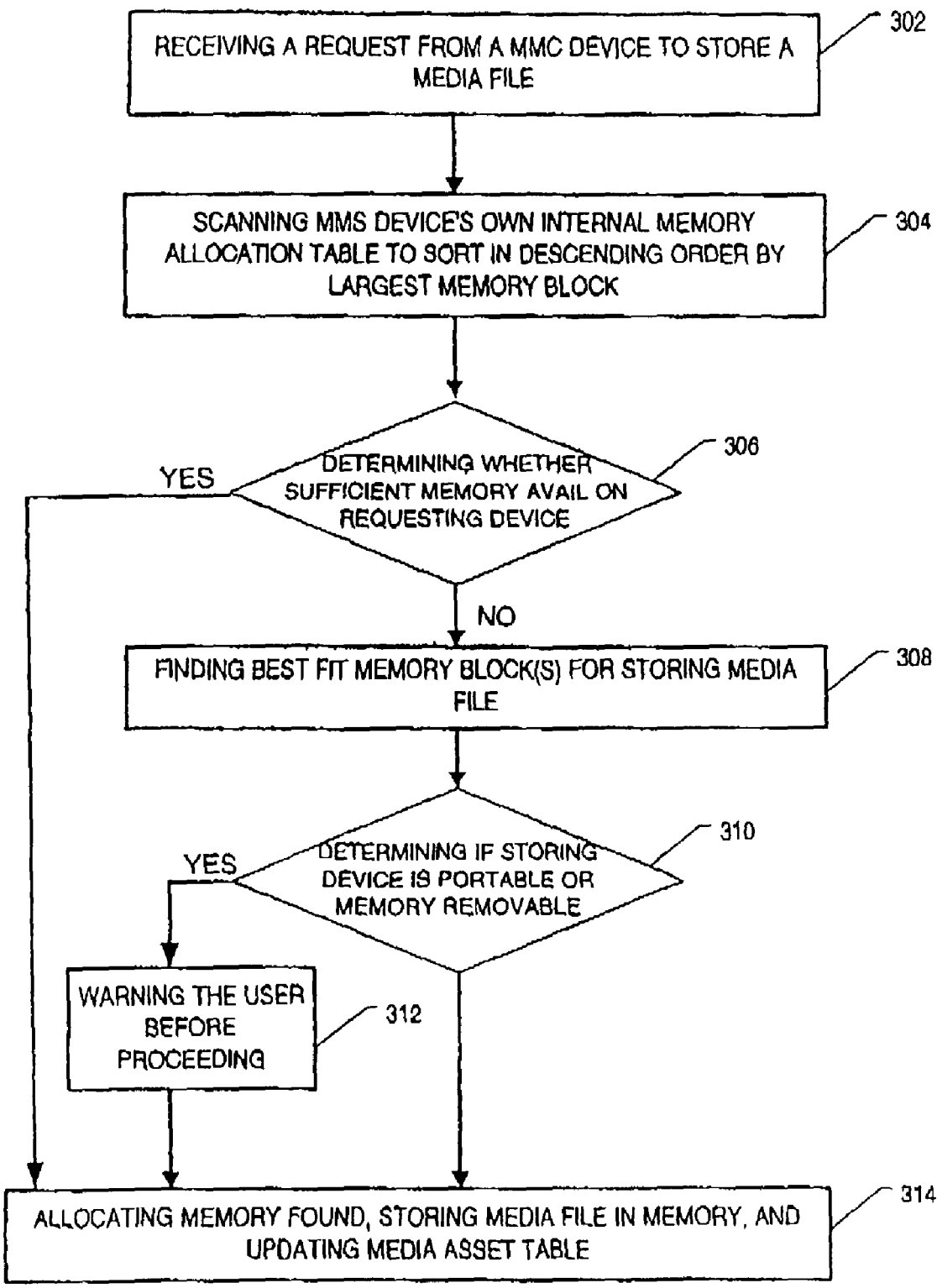
FIG. 3 is a flow chart of an embodiment of a method for the MMS to process a storage request for a new media file and to perform overall memory management.

FIG. 3 is a flow chart of an embodiment of a method for the MMS to process a storage request for a new media file and to perform overall memory management. As indicated by block 302, the MMS device receives via the home network a request from an MMC device to store a media file. The request may include the type of media to be stored, the media file size, and optionally, user-defined parameters specifying the priority level of the media file.

As indicated by block 304, the MMS scans its own memory management tables to sort the devices in descending order by largest memory block available in each device. As indicated by block 306, the MMS device determines whether the MMC device requesting the memory has enough available storage to store the file. If the MMC device has enough available storage to store the file, the memory in the requesting device is allocated to store the file (block 314). Thus, a default assumption may be that the best memory for a given media asset is on the device requesting storage, if possible. This is helpful with devices that are portable or have removable storage.

If the MMC device does not have enough available storage to store the file, the MMS finds a best fit memory block to store the media file, if one is available (block 308). The best fit memory block is the smallest memory block greater than or equal to the size of the media file. If a best fit memory block does not exist, this step comprises memory management acts to find blocks of available memory and to create a linked list structure to break the media file into pieces and store the pieces in the available memory blocks.

As indicated by block 310, an act of determining, using the device profile table 210, if the media file is about to be stored on a portable device or one with removable storage is performed. If so, an act of warning the user of same is performed (block 312). The user is given an option of canceling the memory storage request.

As indicated by block 314, acts of allocating the desired memory, storing the media file in the desired memory, and updating the media asset table are performed. Storing the media file may include breaking the media file into pieces as necessary to store the media file in the allocated memory blocks. It is noted that the allocated memory blocks may reside on a single device, or two or more devices. As a result, the media file can be located and played by the remote device and one or more other devices on the home network.

Figure 4:
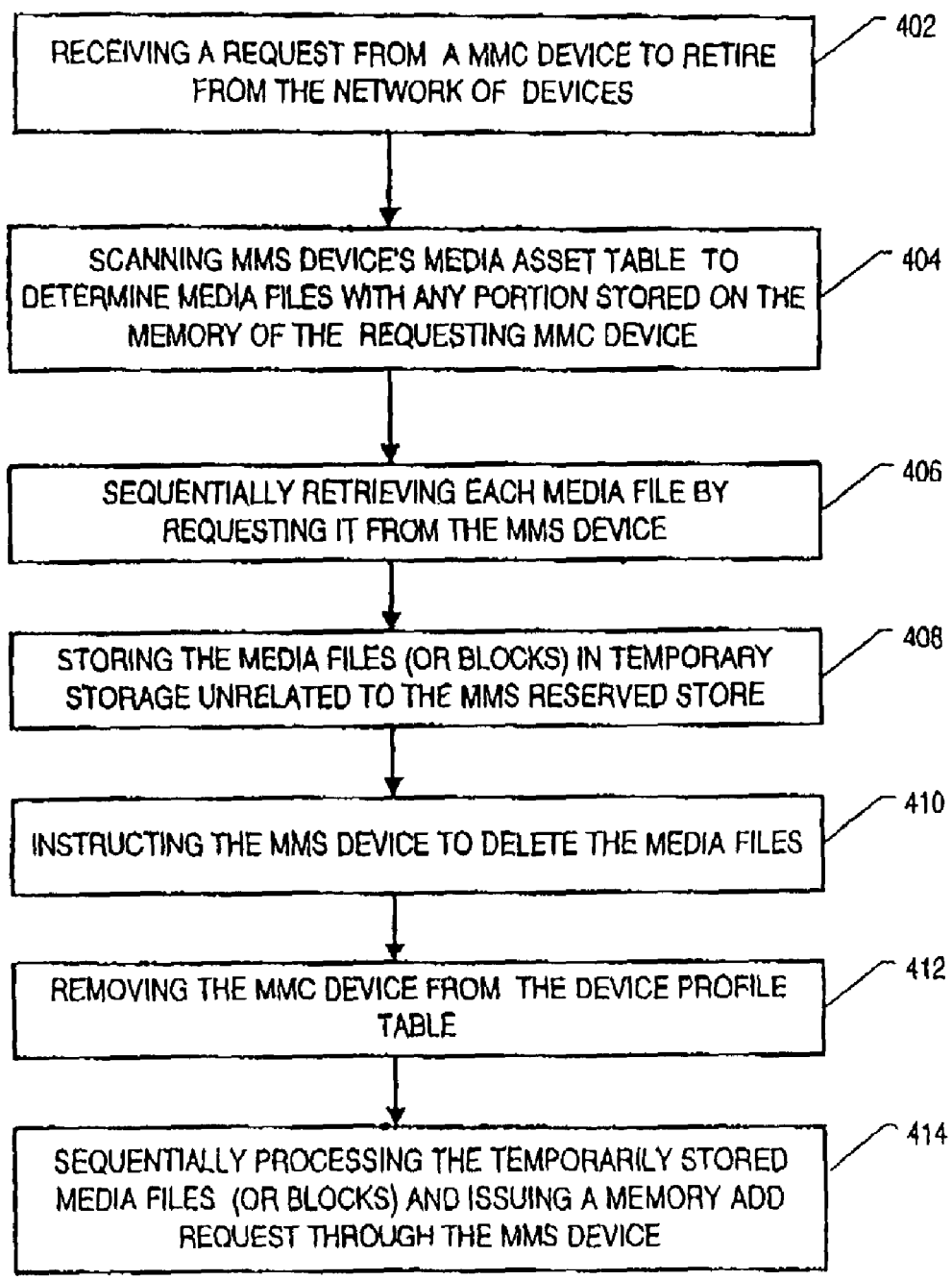
FIG. 4 is a flow chart of an embodiment of a method for the MMS to retire a device and de-allocate its memory usage.

FIG. 4 is a flow chart of an embodiment of a method for the MMS to retire a device and de-allocate its memory usage. The method preserves the media assets that are completely or partially stored on the device to be retired.

As indicated by block 402, a MMC device or MMS slave device issues a request to the MMS master to retire from the network. This act may be initiated from the device to be retired by the user when the device has exceeded its useful life, for example. The MMS master receives the de-allocation request.

As indicated by block 404, the MMS master scans its own media asset table to determine which media files were stored, either entirely or partially, on the device to be retired.

As indicated by block 406, the MMS requests each media asset identified in block 404 to be retrieved from the device to be retired. As indicated by block 408, the retrieved files are copied to a temporary storage area. The temporary storage area is unrelated to the MMS-reserved store. Alternatively, this process can copy only the specific memory blocks stored on the device to be retired.

As indicated by block 410, the MMS initiates a process to sequentially request deletion of each media asset file or block in the device to be retired. As indicated by block 412, the MMS removes an entry for the retiring device from its device profile table 210. As indicated by block 414, the MMS sequentially requests to add each media file or memory block in the temporary storage area to the aggregated storage provided by the remaining devices in the home network. This, in effect, causes the media files to be stored in the remaining devices, and to modify media asset data associated with the media files in the media asset table 230.

Figure 5:
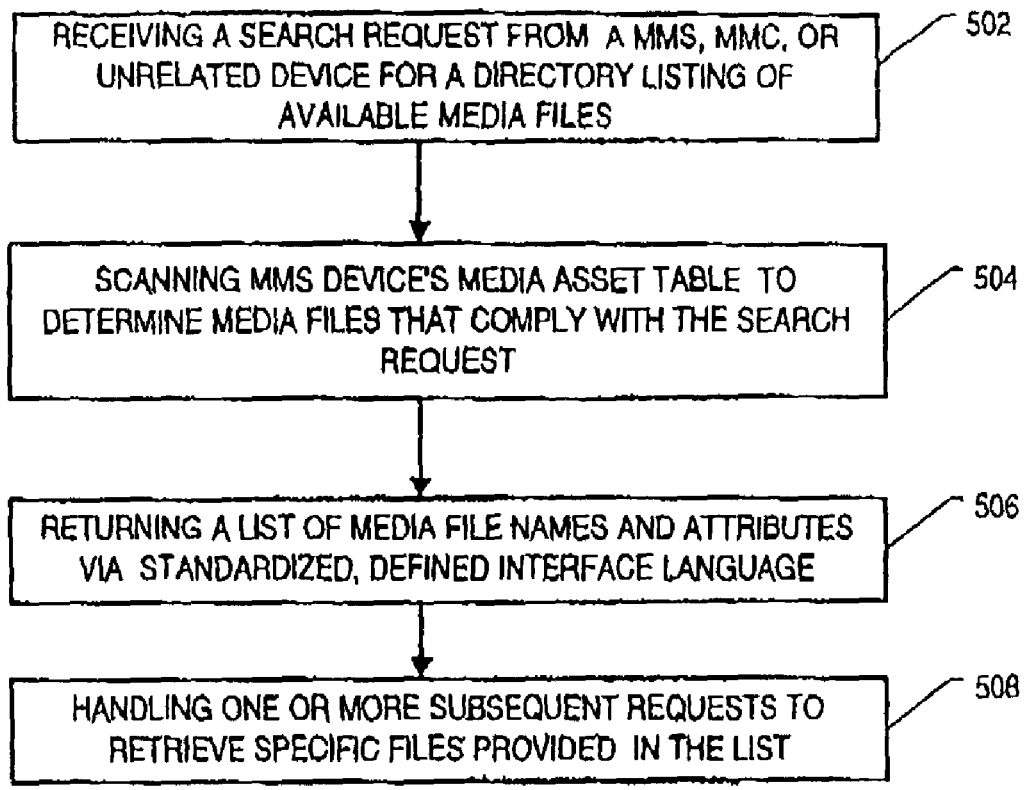
FIG. 5 is a flow chart of an embodiment of a method for the MMS to respond to search requests and to provide a directory listing of media files available from the memory of all devices matching the search query.

FIG. 5 is a flow chart of an embodiment of a method for the MMS to respond to search requests and to provide a directory listing of media files available from the memory of all devices matching the search query. This method may be associated with a home Web site that supports browsing of titles, and/or a mini-browser interface residing on one of the MMC devices.

As indicated by block 502, the MMS device receives a request from another device for a directory of available media files. The requesting device may be one of the devices participating in the aggregated storage scheme, or may be a device that does not participate in the aggregated storage scheme. Standard search requests can be used in this act, including requesting files of a specific media type (e.g. MP3 files or JPEG image files), requesting files of a particular title, and requesting files of a particular category.

As indicated by block 504, the MMS scans the media asset table to determine which files in the store comply with the search request. As indicated by block 506, a list of files matching the search criteria is returned. The list may be returned using a standardized, predefined interface control language (e.g. XML). As indicated by block 508, the MMS responds to one or more subsequent requests, based on the list, to retrieve a specific media file and supply the specific media file to a requesting device.

In summary, certain embodiments of the present invention create a pool of memory based on all of the user's network-enabled devices. Users no longer have to worry about where each piece of media is stored, and how to move media for use on another device. If a user has a home server with 20 Gigabytes of memory available for storing media, and then purchases an MP3 player with 1 Gigabyte of memory, their virtual media store grows to 21 Gigabytes. A central media management process running on one device manages all digital media requests. Particular embodiments disclosed herein capitalize on newer Internet appliances and the decreasing cost of memory.

For purposes of illustration and example, consider the following scenario of a user's experience with an illustrative embodiment of the present invention. A customer purchases a PC and installs the media management driver software. The software directs the user to set an amount of disk storage to reserve for media storage. Consider the user reserving 20 Gigabytes. The software installs a service that is to receive requests from other devices to join the media network and access existing content.

The customer uses a music service like Pressplay™, MusicNet™, or Apple's iTunes™ to download numerous purchases of digital music files (in an MP3, WMA or AAC format).

The customer purchases a set-top box for his/her satellite service. The set-top box has disk storage for PVR and other functions. The set-top box also has the media management driver software to function as either the central service manager or a client to another already-installed service. When connected to the home network, the set-top box sends a request for existing media management services.

The PC responds to the request, and causes the set-top box to set itself as a media management client device. The set-top box signals its amount of available memory to the PC. In this example, consider the set-top box having 10 Gigabytes of available memory.

The PC adds the available memory of the set-top box to the virtual media store. As a result, the virtual media store has 30 Gigabytes available for media storage. In addition, the set-top box, having audio decoding capabilities, has access to the same repository of music originally downloaded for use on the PC.

The customer's family ultimately orders several movies for download to the set-top box. Eventually, only 2 Gigabytes of local storage is available when the family orders a video that is 5 Gigabytes in length. As in any memory request processed by the system, the media management client informs the server that a 5 Gigabyte file is to be obtained. In this instance, the server may either (a) return a link to a 5 Gigabyte piece of memory on the PC, or (b) perform a memory management process to put some pages on the set-top box, and the remainder of the PC.

The customer later purchases a digital camera. When first turned on, the digital camera uses a built-in, mini media management client to advertise itself on the home network. The media management service on the PC acknowledges the digital camera client.

The digital camera has a memory stick with 256 MB RAM that is allocated into the virtual media store but identified as removable or dynamic. This prevents movies and other content that may be viewed on stationary devices in the home from having certain pages stored on the digital camera. However, the digital camera's photos at any given time are still accessible to the PC and set-top box for viewing.

It will be apparent to those skilled in the art that the disclosed embodiments may be modified in numerous ways and may assume many embodiments other than the preferred forms specifically set out and described herein. For example, the device profile data and the media asset data can be stored in data structures other than tables.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
a media management server module on a computer-readable storage medium, the media management server module to:
provide residential gateway functions that include home networking;
receive device characteristics of a first device of a plurality of devices in a user premises, the device characteristics including a size of a memory associated with the first device, an allocation status of the memory, a first indicator to indicate whether the memory is removable, and a second indicator to indicate whether the first device is portable;
maintain device profile data for each of the plurality of devices, the device profile data including an indication of available memory for each of the plurality of devices;
manage storage of media assets across aggregate available memory of the plurality of devices based on the device profile data of each of the plurality of devices;

receive a request from a requesting device to store a media file;

determine a smallest memory block of the available memory for each of the plurality of devices;

when the smallest memory block is greater than or equal to a size of the media file, store the media file at the smallest memory block;

when the smallest memory block is less than the size of the media file, identify blocks of the available memory, break the media file into pieces, and store the pieces in the identified blocks via a linked list structure;

generate a first warning when the media file is to be stored on a removable device based on a first data element in the device profile data that indicates whether the requesting device is removable; and generate a second warning when the media file is to be stored on a device having removable storage based on a second data element in the device profile data that indicates whether the requesting device includes the removable storage.

2. The apparatus of claim 1, further comprising media asset data stored by the computer-readable storage medium, the media asset data associated with the media assets.

3. The apparatus of claim 1, wherein the media management server module and the computer-readable storage medium are included in a computing device having a processor, a main memory, secondary storage, and a home network interface.

4. The apparatus of claim 2, wherein the media asset data comprises, for each of the media assets, a respective first data element to uniquely identify the media asset, a respective second data element to indicate a title of the media asset, a respective third data element to indicate a category of the media asset, a respective fourth data element to indicate a media type of the media asset, a respective fifth data element to indicate a distribution source of the media asset, a respective sixth data element to identify the device where the media asset is stored, and a respective seventh data element to identify a base address where the media asset is stored in a memory of the device.

5. The apparatus of claim 3, wherein the computing device comprises a set top box device.

6. The apparatus of claim 3, wherein the computing device includes a digital subscriber line modem.

7. The apparatus of claim 3, wherein the computing device comprises a set top box to receive at least one of satellite television services and cable television services.

8. The apparatus of claim 3, wherein the home network interface comprises at least one of an ethernet interface, a universal serial bus interface, a power line networking interface, an 802.11 wireless interface, and an ultra wideband interface.

9. The apparatus of claim 1, wherein the media management server module configures itself as a slave module for redundancy after detecting a presence of an existing media management server module in another one of the plurality of devices.

10. The apparatus of claim 1, wherein the media management server module manages data replication across multiple devices of the plurality of devices to ensure that identical pieces of data are stored on different devices for redundancy.

11. An apparatus comprising:

a device having a memory; and a media management client module in the device, the media management client module to:

provide a user option to initialize a media management memory feature by broadcasting a message over a home network in a user premises to query for an existence of a media management server device that includes a broadband modem and that provides residential gateway functions that include home networking; and when the media management server device is located, send to the media management server device characteristics of the device including a size of the memory, an allocation status of the memory, a first indicator to indicate whether the memory is removable, and a second indicator to indicate whether the device is portable, and an indication of available memory in the memory of the device to be aggregated by the media management server device with available memory of at least one second device for storage of media assets across aggregated available memory of the device and the at least one second device;

wherein the media management server device is to receive a request from a requesting device to store a media file, to determine a smallest memory block of the available memory of the device and the at least one second device, to store the media file at the smallest memory block when the smallest memory block is greater than or equal to a size of the media file, when the smallest memory block is less than the size of the media file the media management server device to identify blocks of the available memory, to break the media file into pieces, and to store the pieces in the identified blocks via a linked list structure, the media management server device to generate a first warning when the media file is to be stored on a removable device based on device profile data that indicates whether the requesting device is a removable device, and wherein the media management server device is to generate a second warning when the media file is to be stored on a device with removable storage based on device profile data that indicates whether the requesting device includes removable storage.

12. The apparatus of claim 11, wherein after initialization, the media management client module is to send subsequent requests to store media files to the media management server device.

13. The apparatus of claim 11, wherein the media management client module is pre-installed on the device.

14. The apparatus of claim 11, wherein the device comprises a digital camera.

15. The apparatus of claim 11, wherein the device comprises a music player.

16. The apparatus of claim 11, wherein the device comprises a set top box to receive at least one of satellite television services and cable television services.

17. The apparatus of claim 11, wherein to initialize the media management memory feature, the media management client module is further to send a third data element to indicate a device type of the device.

18. The apparatus of claim 11, wherein to initialize the media management memory feature, the media management client module is further to send a third data element to indicate at least one type of media that is playable by the device.

19. The apparatus of claim 11, wherein to initialize the media management memory feature, the media management client module is further to send a third data element to indicate a first free memory location of the device.

20. The apparatus of claim 11, wherein to initialize the media management memory feature, the media management client module is further to send at least one data element to indicate an available memory range of the device.

21. The apparatus of claim 11, wherein the media management client module is further to assign a lesser priority to a first request for storage from a first device that is removable from the home network, when a second request for storage arrives from a second device that is to remain in the home network.

22. The apparatus of claim 12, wherein the media management client module is to request that the media management server device retrieve one of the media files for playback by the device.

* * * * *